United States Patent [19]
Soltis

[11] Patent Number: 4,779,789
[45] Date of Patent: Oct. 25, 1988

[54] METHOD AND APPARATUS FOR CONSTRUCTING AN ELECTRICAL CONTACT

[75] Inventor: Mike Soltis, Dearborn, Mich.
[73] Assignee: Ford Motor Company, Dearborn, Mich.

[21] Appl. No.: 938,185
[22] Filed: Dec. 5, 1986
[51] Int. Cl.[4] ..................... H01T 21/02; B23K 11/36
[52] U.S. Cl. ..................... 228/104; 228/105; 228/159; 29/879; 445/7
[58] Field of Search ............... 228/103, 104, 105, 159, 228/160; 29/877, 879; 313/352, 141; 445/7

[56] References Cited

U.S. PATENT DOCUMENTS 2,784,297 3/1957 Pityo .................. 219/58
3,431,614 3/1969 Hallauer et al. .................. 445/7
3,460,238 8/1969 Christy et al. .................. 228/159
3,643,101 2/1972 Shipp et al. .................. 350/162
3,891,789 6/1975 Swengel, Sr. et al. .................. 219/104
3,976,240 8/1976 Matrisian .................. 228/5.1
4,282,759 8/1981 Merrell .................. 228/104 X

*Primary Examiner*—Kenneth J. Ramsey
*Attorney, Agent, or Firm*—Jerome R. Drouillard; Roger L. May

[57] ABSTRACT

A method and apparatus for constructing an electrical contact including welding means for welding a base element to a blank comprised of contact facing material, separating means for separating finished electrodes from the balance of the contact facing material, examining means for examining an aperture formed within the contact material blank when the finished electrode is separated from the blank, and classifying means for classifying the finished electrode as acceptable or unacceptable depending upon the examination.

10 Claims, 2 Drawing Sheets

METHOD AND APPARATUS FOR CONSTRUCTING AN ELECTRICAL CONTACT

BACKGROUND OF THE INVENTION

1. Field of the Invention

The present invention is related to a method and apparatus for constructing an electrical contact or electrode, which may, for example, comprise a sparkplug.

2. Disclosure Information

Designers have long recognized the need for constructing electrical contacts or electrodes from composite materials. The need for such composites results from the motivation, on the one hand, to reduce the cost of the electrical contact or electrode by using a relatively cheaper conducting material for the bulk of the electrode, while maximizing, on the other hand, the durability of the electrode by introducing a more durable, but more costly, contact or tip material in the critical working area. Accordingly, U.S. Pat. No. 3,431,614 discloses a method for manufacturing an electrode having a metal core, a tubular metal sheath surrounding the core, and a welded metal cap enclosing the sheath. The metal cap is sheared from the material from which the cap is formed. It is possible, however, that electrodes may be produced according to this method which appear to be satisfactory but have caps which are not completely welded to the outer tubular sheath. This occurs because the shearing action will not seriously stress the bond between the metal cap and the tubular metal sheath. Separation of the tip from the balance of the electrode is a serious defect for any electrical component, but it is particularly serious with respect to automotive sparkplugs because a metallic object such as an electrode cap could cause destruction of an engine were the cap to become loose in the engine's combustion chamber.

A second type of electrode formation is disclosed in U.S. Pat. No. 3,976,240 in which an ultrasonic welding unit is employed for the purpose of welding a gold foil element onto a second metal member within the confines of a perforated metal plate. The balance of the gold foil element lying outside the welded portion is then stripped off through the shearing action of the perforated metal plate. This method suffers from a similar deficiency to that previously noted inasmuch as the shearing action employed for separating the balance of the non-welded contact material from the piece to which the contact is being applied may be conducted successfully, i.e., the shearing may occur successfully, even when the precious metal contact strip has not been properly applied to the electrode material.

Examples of methods for welding strips and pins together are shown in U.S. Pat. Nos. 2,784,297 and 3,891,789. Neither of these patents, however, are directed to a solution of the previously described problem regarding integrity of welding or bonding used for electrodes and electronic contacts.

U.S. Pat. No. 3,643,101 discloses a means for measuring the diameter of a small orifice based upon multiple detectors arranged to measure the intensity of radiation from a laser source emanating through the hole to be measured. This technique, as will be understood in view of this disclosure, may be employed with the method disclosed herein for assessing the quality of a welded electrode assembly.

SUMMARY OF THE DISCLOSURE

An electrode or electrical contact comprises a base element which may, for example, be of a generally cylindrical configuration, and having a free end, and a contact facing applied to the free end in the form of a blank of contact facing material having a larger area than the free end to which the contact facing material is applied. The final shape of the contact facing material is determined by tensile fracture of the contact facing material in a region circumscribing the outer periphery of the generally cylindrical element. The tensile fracture results from axial pulling of the electrode away from the contact facing material blank. A method for constructing an electrical contact or electrode as described above preferably comprises the steps of attaching a base element to one segment of a blank comprised of contact facing material and separating the attached segment from the remainder of the blank by subjecting the blank to tensile stress applied at least in part by the base element. The contact facing material is preferably attached to the base element by welding, brazing, soldering, chemical bonding or other known means. Following the attachment of the base element and contact facing, the aperture formed within the blank by the separation of the segment of contact facing material from the balance of the blank may be examined, so as to assess the quality of the attachment of the contact facing material to the base element. This gaging will also disclose the extent to which the base element is covered by the contact facing material. The gaging of the aperture may be by mechanical means or by optical gaging such as through the use of laser techniques as disclosed in U.S. Pat. No. 3,643,101, which is hereby incorporated by reference into the specification of this application.

An apparatus for constructing electrodes according to the invention preferably comprises welding means for welding a base element to a blank comprised of contact facing material, separating means for separating the electrode from the blank of contact facing material, and means for examining the aperture formed in the blank when the electrode is separated from the blank, so that proper operation of the welding means may be verified. The apparatus may further comprise classifying means for classifying electrodes produced by the apparatus as acceptable or unacceptable based upon the reading from the examining means. A method and apparatus according to the present invention may be used for constructing a variety of electrical contact devices, including a sparkplug.

It is an object of the present invention to provide an electrode or electrical contact having a composite construction in which a contact facing applied to a base element has its final shape determined by tensile fracture of the contact facing material in a region circumscribing the outer periphery of the base element.

It is another object of the present invention to provide a method for constructing an electrical contact or electrode in which proper attachment of a base element to a contact facing is assured by virtue of the fact that the segment of contact facing material attached to the base element is separated from a larger blank of contact facing material by pulling the base element and an attached piece of contact facing material from the contact facing material blank. The resulting aperture in the contact facing material is then examined to determine the quality of the attachment between the base element and the contact facing material.

It is a further object of the present invention to provide a method and apparatus for inspecting the quality of the weld between the base element and the contact facing material.

The method and apparatus of the present invention solve the problems of the prior art because attachment of the contact facing material to the base element may readily be assured through inspection of the blank from which the contact facing is removed by tensile force. Accordingly, if the aperture formed in the contact facing material is less than a full circle, the electrode should be rejected. Similarly, in the event that no aperture is formed within the contact facing blank, the electrode should clearly be rejected because little or no contact facing material has been deposited upon the electrode. It is thus an advantage of the present invention that electrodes produced with the disclosed method and apparatus will have greater integrity than those produced with prior art methods.

DESCRIPTION OF THE PREFERRED EMBODIMENTS

Figure 1:
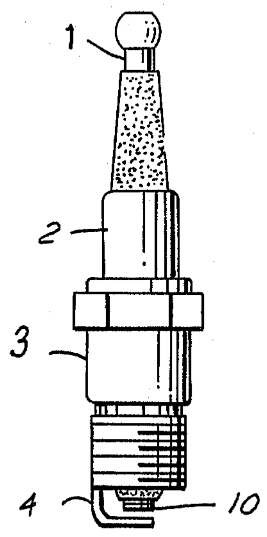
FIG. 1 shows a sparkplug comprising but one application of the present invention.

As shown in FIG. 1, the method and apparatus of this invention may be used for producing sparkplugs of the type commonly employed in automotive engines. Such sparkplugs typically comprise a cylindrical center electrode, 1; an insulator, 2, surrounding electrode 1 for the balance of its length; a generally cylindrical shell, 3, which surrounds a portion of insulator 2, and an outer electrode, 4, which is attached to shell 3, and which is in juxtaposition with center electrode 1. The sparkplug shown in FIG. 1 further comprises contact facing 10 applied to center electrode 1 according to the method of the present invention. The method and apparatus described and claimed herein may be used beneficially to produce a variety of electrical contacts, contactors, contact sets, sparkplugs, or other electrode containing devices in which a base element comprised of a material such as a nickel alloy, for example, or another type of alloy containing ferrous or nonferrous metals or nonmetals is desired to be joined with a relatively more durable, or perhaps, more expensive material such as platinum, gold or other metals or nonmetallic substances.

Figure 2:
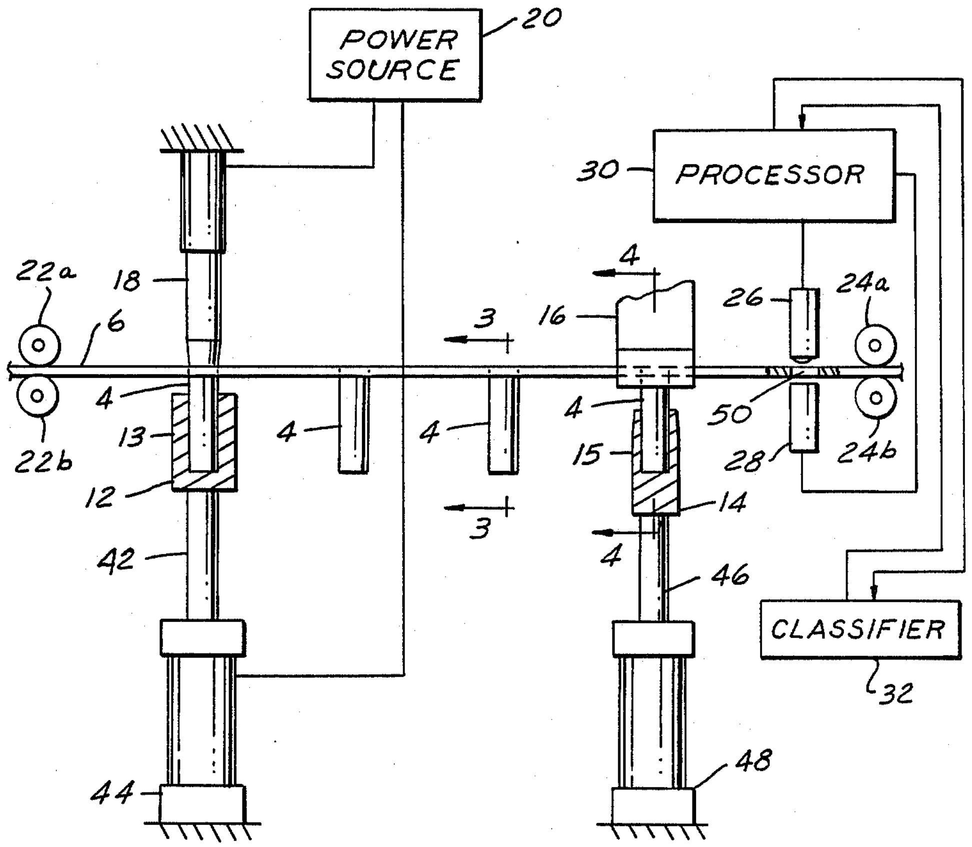
FIG. 2 is a diagrammatic representation of an apparatus and processing steps according to the present invention.

As shown in FIG. 2, a blank or ribbon of contact facing material 6 is moved through the apparatus shown therein by means of lead rollers 22*a* and 22*b* and tail rollers 24*a* and 24*b*. In the first step of the process, base element 4 is abutted to blank 6 by means of welding fixture 12. Welding fixture 12 comprises a chuck 13 which grips base element 4, a ram 42 for advancing base element 4 against blank 6, and a base 44 for mounting the welding fixture. Base element 4 is maintained in abutment with contact facing material 6 and welding tip 18 is advanced against the opposite side of contact facing material 6. Power source 20 provides a source of electrical current which is passed through contact facing material 6, thence through base element 4 and welding fixture 12. In this manner, a segment of contact facing material blank 6 is welded to base element 4. In view of this disclosure those skilled in the art will recognize that the method and apparatus employed for attaching a segment of contact facing material blank 6 to base element 4 may be selected from one of a variety of methods including not only resistance welding, but also other types of welding, brazing, soldering, impact welding, ultrasonic welding, chemical bonding, and other methods compatible with apparatus other than that illustrated in this document.

Figure 3:
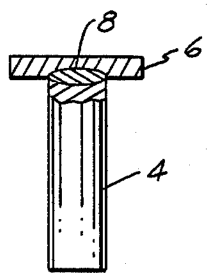
FIG. 3 shows a base element which has been welded to contact facing material. This figure is taken along line 3—3 of FIG. 2.

FIG. 3 shows a welded composite of contact material blank 6 and base element 4. Fusion zone 8 is generally elliptical in shape and marks the area in which base element 4 and contact facing material 6 were melted and intermixed during the welding process.

Once having been welded to contact facing material blank 6, base element 4 is conveyed by rollers 22 and 24 to a separating station in which separating die 16 and separating fixture 14 are operated to remove the finished electrode from contact facing material blank 6. Those skilled in the art will appreciate in view of this disclosure that separating die 16 could, depending upon the requirements posed by the composition of material blank 6, comprise a clamping type of die fixture, a slip die, or yet other types of holding fixtures.

Figure 4:
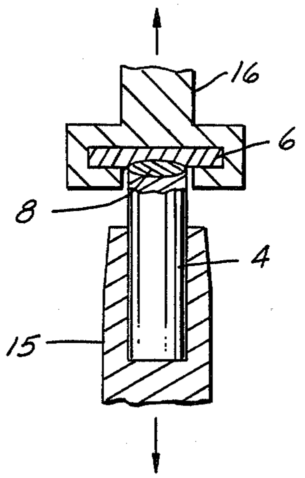
FIG. 4 shows apparatus for separating a base element and its attached contact facing from a contact facing material blank. This figure is taken along the line 4—4 of FIG. 2.
Figure 5:
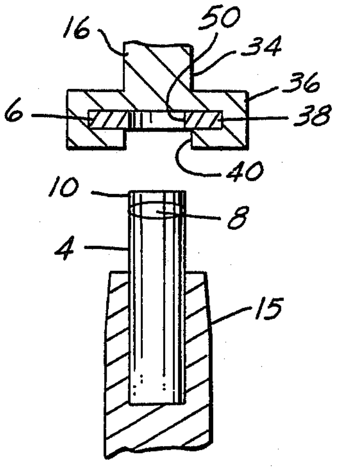
FIG. 5 is similar to FIG. 4, but shows a finished electrode which has been separated from a contact facing material blank.

The general position of separating fixture 14 with respect to separating die 16 and further with respect to contact facing material blank 6 is generally shown in FIG. 2 and more particularly shown in FIGS. 4 and 5. Separating fixture 14 comprises chuck 15 which tightly grips base element 4, ram 46 to which chuck 15 is fixed, and base 48. The separating fixture is capable of exerting considerable force to pull base element 4 and an attached segment of contact facing material 6 axially away from the balance of contact facing material 6, as described below.

Figure 6:
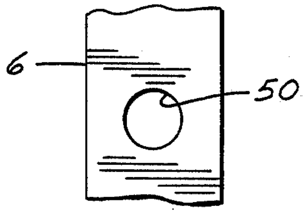
FIG. 6 shows a contact facing material blank having a circular aperture indicating that proper attachment was achieved between the base element and the contact facing material.

FIG. 4 shows separating fixture 15, and separating die 16, in their positions prior to separation of the finished electrode from contact material blank 6. Detailed construction of the separating die is shown in (FIG. 5. The die comprises shank 34 having a headstock 36 attached thereto. A slot 38 is provided for contact facing material blank 6 to slide through. Aperture 40 is circular in shape and allows access of base element 4 into the interior of the die. As shown in FIG. 5, axial separation of base element 4 and contact facing 10, comprising a segment of contact facing material blank 6, produces an aperture within contact facing material blank 6. The outline of the aperture will be approximately as shown in FIG. 6 provided the weld between base element 4 and contact facing material blank 6 was properly performed. As shown in FIG. 6, a circular aperture 50 is opened in contact facing material blank 6 when the attached segment 10 of contact facing material blank 6 was pulled from the balance of the contact facing material blank. If, on the other hand, an aperture 52, as shown in FIG. 7, is formed in contact material blank 6, the irregular shape of aperture 52 indicates that the weld between base element 4 and contact facing material blank 6 was not properly performed.

The shape of the aperture 50 or 52 formed in contact facing material blank 6 may be used to classify the resultant finished electrode as being acceptable or unacceptable.

Figure 7:
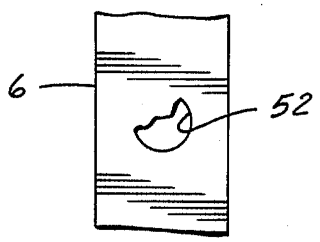
FIG. 7 shows a contact facing material blank having an irregularly shaped aperture which indicates that proper attachment was not achieved between the base element and contact facing material.

As can be seen from FIGS. 5–7, the outline of contact element 10 is determined by the tensile fracture of contact facing material 6, which occurs when the separating fixture pulls the finished electrode away from the remainder of contact facing material blank 6. Because considerable force is required to fracture blank 6, fusion zone 8 must be well developed to cause a circular aperture of the type shown in FIG. 6 to be opened in blank 6. In this connection it should be noted that this disclosure will suggest other arrangements for the apparatus illustrated in FIG. 2, which is merely intended to be exemplary of a class of apparatus suitable for practicing the present invention.

Those skilled in the art will appreciate that several of the known techniques for examining the integrity of spot welds have, for years, included the separation or pulling of such welds to determine whether an aperture or torn area is opened into one of the two metals which have been spot welded. The apparatus of this invention, including an energy source 26, receiver 28, processor 30 and classifier 32 allows such a technique to be used with the present invention. In this case, contact facing material blank 6 is advanced along each station sequentially so that following axial separation of the finished electrode by the separating die, the contact facing material blank is then positioned so that the aperture formed in the contact material blank may be optically gaged. Accordingly, as shown in FIG. 2, energy source 26 is arranged so as to impinge upon contact material blank 6 in the locus of an aperture. The energy emanating from energy source 26 and passing through the aperture within the contact material blank is received by receiver 28, which transmits a signal to processor 30. Depending upon the level of energy received by receiver 28, processor 30 transmits a signal to classifier 32 regarding the acceptability of a particular finished electrode. In the event that the finished electrode is unacceptable, it will be rejected by classifier 32. If the electrode is acceptable, classifier 32 will allow the electrode to continue for further processing. In view of this disclosure those skilled in the art will recognize that other means could be used for gaging the apertures 50, 52 within contact material blank 6. Accordingly, mechanical gaging means such as those employing tapered pins or the like which would be inserted into the aperture could be used. Other gaging means could be used as well including X-ray inspection, ultrasonic methods, laser techniques and others.

Additional methods could be employed for assessing the quality of the weld or to the extent to which the base element is covered by the contact facing material. For example, the amount of force required to be imparted by separating fixture 14 in order to axially pull base element 4 and the welded segment of contact facing material blank 6 from the balance of the contact facing material blank could be measured. Another method could involve measurement of the current passing through welding electrode 18 during the welding process. In any event, other methods will be suggested by this disclosure.

The invention has thus been shown and described as reference to specific embodiments. However, it should be noted that the present invention is in no way limited to the details of the illustrated structure and methods, but changes and modifications may be made without departing from the scope of the appended claims.

I claim:

1. A method for constructing an electrical contact comprising a base element and a contact facing, comprising the steps of:

attaching said base element to one segment of a blank comprised of contact facing material;

separating said attached segment from the remainder of said blank by subjecting said blank to tensile stress applied at least in part by said base element; and examining an aperture formed within said blank by the separation of said segment of said blank attached to said base element, whereby the quality of the attachment of said contact facing material to said base element may be determined.

2. A method for constructing an electrical contact comprising the steps of:

attaching one end of a base element to a segment contained within a larger blank of contact facing material;

separating said base element and said attached segment of said contact facing material from the remainder of said blank by fixedly holding said blank while axially pulling said base element away from said blank, thereby forming an aperture in said blank; and gaging the aperture formed in said contact facing material whereby the extent to which the base element is covered by the contact facing material may be determined.

3. The method according to claim 2 wherein an optical apparatus is used for gaging the aperture formed in said contact facing material.

4. The method according to claim 2 wherein a mechanical gaging apparatus is employed for the purpose of gaging the aperture formed in said contact facing material.

5. The method according to claim 2 wherein said base element and said segment contained within a larger blank of contact facing material are welded together.

6. A method according to claim 2 further comprising the step of classifying each finished contact as acceptable or unacceptable based upon said gaging step.

7. An apparatus for constructing an electrode having a base element and a welded contact element comprising:

welding means for welding said base element to a blank comprised of contact facing material;

separating means for separating said electrode from said blank of contact facing material;

examining means for examining the aperture formed in said blank when said electrode is separated from said blank; and classifying means operatively connected with said examining means for classifying electrodes produced by said apparatus as acceptable or unacceptable, based upon the reading from said examining means.

8. The apparatus according to claim 7 wherein said examining means comprises an optical system.

9. The apparatus according to claim 7 wherein said examining means comprises a mechanical gaging system.

10. The apparatus according to claim 7 wherein said separating means comprises means for fixedly holding said blank while axially pulling said base element away from said blank.

* * * * *